(12) United States Patent
Kim et al.

(10) Patent No.: US 9,199,850 B2
(45) Date of Patent: Dec. 1, 2015

(54) METHOD OF FABRICATING LIFEPO$_4$ CATHODE ELECTROACTIVE MATERIAL BY RECYCLING, AND LIFEPO$_4$ CATHODE ELECTROACTIVE MATERIAL, LIFEPO$_4$ CATHODE, AND LITHIUM SECONDARY BATTERY FABRICATED THEREBY

(71) Applicant: KOREA INSTITUTE OF SCIENCE AND TECHNOLOGY, Seoul (KR)

(72) Inventors: Hyung Sun Kim, Seoul (KR); Byung Won Cho, Seoul (KR); Hwa Young Lee, Seoul (KR); Su Jin Kim, Seoul (KR); Eun Jung Shin, Gyeonggi-do (KR); Kyung Yoon Chung, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 299 days.

(21) Appl. No.: 13/651,765

(22) Filed: Oct. 15, 2012

(65) Prior Publication Data
US 2013/0313485 A1    Nov. 28, 2013

(30) Foreign Application Priority Data

May 25, 2012 (KR) .................. 10-2012-0056134

(51) Int. Cl.
*C01B 25/00* (2006.01)
*C01B 25/37* (2006.01)
*C01B 25/45* (2006.01)
(Continued)

(52) U.S. Cl.
CPC ............ *C01B 25/375* (2013.01); *C01B 25/45* (2013.01); *H01M 4/1397* (2013.01); *H01M 4/5825* (2013.01); *H01M 4/0471* (2013.01); *H01M 4/625* (2013.01); *Y02E 60/122* (2013.01)

(58) Field of Classification Search
CPC .................................. H01B 1/04; H01B 1/12
USPC .............................. 252/506, 519.3; 429/221
See application file for complete search history.

(56) References Cited

U.S. PATENT DOCUMENTS

2010/0062339 A1 *   3/2010   Pan et al. ............... 429/231.95
2010/0279117 A1 *  11/2010   Gu .............................. 428/402

FOREIGN PATENT DOCUMENTS

CN       101383441   A   *   3/2009
CN       101916889   A   *  12/2010
(Continued)

*Primary Examiner* — Khanh Tuan Nguyen
*Assistant Examiner* — Danny N Kang
(74) *Attorney, Agent, or Firm* — Ladas & Parry LLP

(57) ABSTRACT

The present invention relates to a method for fabricating a LiFePO4 cathode electroactive material for a lithium secondary battery by recycling, and a LiFePO4 cathode electroactive material for a lithium secondary battery, a LiFePO4 cathode, and a lithium secondary battery fabricated thereby. The present invention is characterized in that a cathode scrap is heat treated in air for a cathode electroactive material to be easily dissolved in an acidic solution, and amorphous FePO$_4$ obtained as precipitate is heat treated in an atmosphere of air or hydrogen so as to fabricate crystalline FePO$_4$ or Fe$_2$P$_2$O$_7$. According to the present invention, a cathode scrap may be recycled by using a simple, environmentally friendly, and economical method. Further, a lithium secondary battery fabricated by using a LiFePO$_4$ cathode electroactive material from the cathode scrap is not limited in terms of performance.

10 Claims, 4 Drawing Sheets

(51) Int. Cl.
H01M 4/1397 (2010.01)
H01M 4/58 (2010.01)
*H01B 1/12* (2006.01)
*H01M 4/02* (2006.01)
*H01M 4/04* (2006.01)
*H01M 4/62* (2006.01)

(56) References Cited

FOREIGN PATENT DOCUMENTS

KR 1020080018734 A 2/2008
KR 1020120030865 A 3/2012

\* cited by examiner (a)

(b)

METHOD OF FABRICATING LIFEPO$_4$ CATHODE ELECTROACTIVE MATERIAL BY RECYCLING, AND LIFEPO$_4$ CATHODE ELECTROACTIVE MATERIAL, LIFEPO$_4$ CATHODE, AND LITHIUM SECONDARY BATTERY FABRICATED THEREBY

CROSS-REFERENCE TO RELATED APPLICATION

This application claims priority to and the benefit of Korean Patent Application No. 2012-0056134, filed on May 25, 2012, the disclosure of which is incorporated herein by reference in its entirety.

BACKGROUND

1. Field of the Invention

The present invention relates to a method for fabricating a LiFePO$_4$ cathode electroactive material for a lithium secondary battery by recycling, and a LiFePO$_4$ cathode electroactive material for a lithium secondary battery, a LiFePO$_4$ cathode, and a lithium secondary battery fabricated thereby.

2. Discussion of Related Art

A lithium ion secondary battery having improved characteristics of high capacity, high power, and long life, is widely used for small electronic products such as electronic equipment, portable computers, and cell phones. In particular, as the issues of green growth and new renewable energy receive attention, the demand for lithium ion secondary batteries is expected to rapidly increase with commercialization of electric vehicles.

Various kinds of materials for cathode active materials for a lithium ion secondary battery have been developed. Recently, as well as conventional materials such as LiCoO$_2$ and ternary system active material (LiCo$_{1/3}$Ni$_{1/3}$Mn$_{1/3}$O$_2$), LiFePO$_4$ which is an olivine-based material, is spotlighted as a cathode active material for a high-capacity lithium ion secondary battery for an electric vehicle.

In particular, since LiFePO$_4$ is cheaper than other cathode active materials, it is expected that a high-capacity lithium ion secondary battery using LiFePO$_4$ as a cathode active material will be commercialized soon.

Although the lithium ion battery market and industry are expected to be rapidly developed, lithium (Li) metal and related compounds which are indispensable for a cathode active material, do not exist as natural resources in this country (Korea), and are thus imported from foreign countries. Therefore, it is necessary for a country lacking natural resources to collect and recycle cathode scraps generated during a fabricating process of a lithium ion secondary battery or active materials of wasted lithium ion secondary batteries.

According to a conventional method for extracting or collecting various metals such as lithium or compounds from a cathode of a wasted lithium ion secondary battery, the cathode separated from the battery is dissolved with hydrochloric acid (HCl), sulfuric acid (H$_2$SO$_4$), or nitric acid (HNO$_3$), and then is neutralized with alkali in order to precipitate and collect metals such as cobalt and nickel by using hydroxide. Or, by using a solvent extraction technique, metals such as cobalt, manganese, and nickel are separated from the cathode-dissolved solution.

As described above, cobalt and nickel are main targets of collection, and lithium, which is cheaper than cobalt or nickel, is not an object of great attention. However, lithium resources are limited, and it is highly possible to use phosphate-based LiFePO$_4$ not containing cobalt or nickel as a cathode active material for a high-capacity lithium ion secondary battery for an electric vehicle. Therefore, collection or recycling of lithium or related compounds is expected to become a more important issue.

PRIOR ART DOCUMENTS

Patent Documents (Patent Document 1) Korean Patent Application Publication No. 10-2012-0030865, which relates to a method for reprocessing a metallic-oxide-based cathode active material for a lithium ion secondary battery, discloses a method for dissolving a cathode active material of a lithium ion secondary battery by using a sulfuric acid solution containing sulfur dioxide.

(Patent Document 2) Korean Patent Application Publication No. 10-2008-0018734, which relates to a method for selectively eluting and extracting cobalt from a cathode active material of a wasted lithium battery, discloses a method for eluting cobalt by using ammonia water as an eluent and adding a small amount of hydrazine hydrate that is a reducing agent.

SUMMARY OF THE INVENTION

The present invention is directed to a method for fabricating a LiFePO$_4$ cathode electroactive material for a lithium secondary battery by recycling, and a LiFePO$_4$ cathode electroactive material for a lithium secondary battery, a LiFePO$_4$ cathode, and a lithium secondary battery fabricated thereby.

According to an aspect of the present invention, there is provided a method for fabricating a LiFePO$_4$ cathode electroactive material for a lithium secondary battery, the method including: heat treating a cathode scrap including a LiFePO$_4$ cathode electroactive material in an atmosphere of nitrogen; collecting the LiFePO$_4$ cathode electroactive material by separating a current collector from the heat treated LiFePO$_4$ cathode scrap; heat treating the collected LiFePO$_4$ cathode electroactive material in an atmosphere of air; precipitating FePO$_4$ by dissolving the heat treated LiFePO$_4$ cathode electroactive material in an acidic solution, and injecting ammonia water thereto; obtaining a FePO$_4$ solid by filtering the obtained solution; obtaining crystalline FePO$_4$ by heat treating the obtained FePO$_4$ in an atmosphere of air, or obtaining crystalline Fe$_2$P$_2$O$_7$ by heat treating the obtained FePO$_4$ in an atmosphere of hydrogen; and obtaining a LiFePO$_4$ cathode electroactive material by mixing a lithium compound with the obtained FePO$_4$ or Fe$_2$P$_2$O$_7$ such that the mole ratio of Fe to Li is 1:1, mixing a carbon source, and then performing heat treatment in a reducing atmosphere of inert atmosphere.

The carbon source may include at least one selected from the group consisting of carbon black, acetylene black, and sucrose.

The lithium compound may include at least one selected from the group consisting of Li$_2$CO$_3$, Li(OH), and Li$_3$PO$_4$.

The heat treating of the cathode scrap may be performed at a temperature of about 300° C. to about 500° C. for about 1 to 3 hours.

The acidic solution may include at least one selected from the group consisting of hydrochloric acid, phosphoric acid, nitric acid, and sulfuric acid. Ammonia water may be added to the acidic solution to adjust the pH level to between 5 and 8, and the ammonia-water-added solution may be maintained at a temperature of about 20 to 70° C. for about 1 to 12 hours.

The heat treating of the obtained $FePO_4$ may be performed at a temperature of about 400° C. to about 800° C. in an atmosphere of hydrogen for about 1 to 12 hours.

The heat treatment in the reducing atmosphere of inert atmosphere may be performed at a temperature of about 400° C. to about 800° C. for about 6 to 24 hours.

According to another aspect of the present invention, there is provided a $LiFePO_4$ cathode electroactive material for a lithium secondary battery, fabricated according to the method.

According to another aspect of the present invention, there is provided a cathode for a lithium secondary battery, fabricated by using the $LiFePO_4$ cathode electroactive material.

According to another aspect of the present invention, there is provided a lithium secondary battery including the cathode for a lithium secondary battery.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
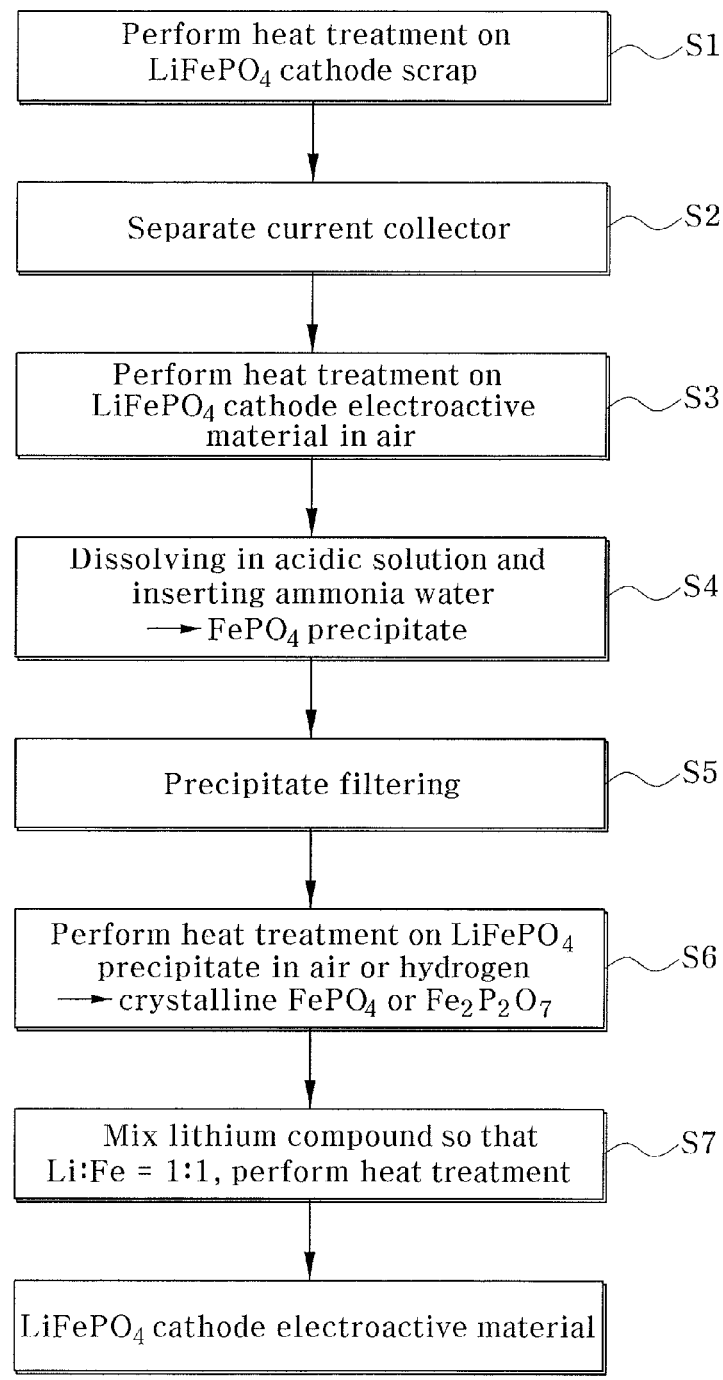
FIG. 1 is a flowchart illustrating a process of fabricating a cathode electroactive material for a lithium secondary battery by recycling according to a first embodiment of the present invention.

Hereinafter, exemplary embodiments of the present invention will be described with reference to the accompanying drawings.

The present invention may, however, be embodied in different forms and should not be constructed as limited to the embodiments set forth herein.

Rather, these embodiments are provided so that this disclosure will be thorough and complete, and will fully convey the scope of the present invention to those skilled in the art. In the drawings, shapes and sizes of elements may be exaggerated for clarity of illustration. Throughout the specification and drawings, like reference numerals denote like elements.

FIG. 1 is a flowchart illustrating a process of fabricating a cathode electroactive material for a lithium secondary battery by recycling according to a first embodiment of the present invention.

Referring to FIG. 1, according to the first embodiment of the present invention, a method for fabricating a $LiFePO_4$ cathode electroactive material for a lithium secondary battery may include: 1) heat treating a cathode scrap including a $LiFePO_4$ cathode electroactive material in an atmosphere of nitrogen in operation S1; 2) collecting the $LiFePO_4$ cathode electroactive material by separating a current collector from the heat treated $LiFePO_4$ cathode scrap in operation S2; 3) heat treating the collected $LiFePO_4$ cathode electroactive material in an atmosphere of air in operation S3; 4) precipitating $FePO_4$ by dissolving the heat treated $LiFePO_4$ cathode electroactive material in an acidic solution, and injecting ammonia water thereto in operation S4; 5) obtaining a $FePO_4$ solid by filtering the obtained solution in operation S5; 6) obtaining crystalline $FePO_4$ by heat treating the obtained $FePO_4$ in an atmosphere of air, or obtaining crystalline $Fe_2P_2O_7$ by heat treating the obtained $FePO_4$ in an atmosphere of hydrogen in operation S6; and 7) obtaining a $LiFePO_4$ cathode electroactive material by mixing a lithium compound with the obtained $FePO_4$ or $Fe_2P_2O_7$ such that the mole ratio of Fe to Li is 1:1, mixing a carbon source, and then performing heat treatment in a reducing atmosphere of inert atmosphere in operation S7.

Hereinafter, each process will be described in detail.

Preliminarily, a cathode scrap for a lithium secondary battery (hereinafter, referred to as a "cathode scrap") may be prepared as follows:

A cathode for a lithium secondary battery may have a structure in which a cathode electroactive layer is formed on a conductive metal thin plate. The conductive metal thin plate serves as a current collector, and any metal having such a level of conductivity as to operate as the current collector may be used for the conductive metal thin plate. More specifically, the conductive metal thin plate may be an aluminum thin plate, but is not limited thereto.

The cathode active material layer may include a cathode active material, a conductive material, and a binder. An electrode reaction may occur in the cathode active material, and the electrons generated during the electrode reaction may be transferred to a current collector or external circuit through the conductive material. The binder may bind cathode active material particles together so as to maintain a form.

By mixing the cathode active material, conductive material, and binder in an organic solvent, slurry may be fabricated. By applying the slurry on the conductive metal thin plate and drying the slurry, a cathode sheet may be fabricated.

The binder may be a water-based binder or organic binder. More specifically, a polymer solution in which sodium carboxymethyl cellulose (1 wt % in water) and styrene butadiene rubber (40 wt % in water) are mixed, may be used as the binder, and polyvinylidene fluoride (PVDF) may be used as the organic binder. However, the binder is not limited thereto.

Any material capable of imparting conductivity to the cathode may be used as the conductive material. More specifically, carbon black (trade name: Denka Black) or graphite (trade name: KS6) may be used.

Any material having excellent electron conductivity may be used as the conductive metal thin plate. More specifically, the conductive metal thin plate may include at least one selected from the group consisting of an aluminum thin plate, a copper thin plate, a gold thin plate, a silver thin plate, and a platinum thin plate.

The cathode sheet may be cut into a desired form in order to be used as a cathode of a lithium secondary battery, and the remnants of the sheet may be collected in order to prepare a cathode scrap.

Further, by separating a cathode from a wasted lithium secondary battery, the cathode scrap may be prepared.

1) In operation S1, the cathode scrap including the $LiFePO_4$ cathode electroactive material may be heat treated in an atmosphere of nitrogen. This treatment is performed to carbonize the binder without affecting characteristics of the $LiFePO_4$ cathode electroactive material.

The heat treatment of operation S1 may be performed at a temperature of about 300 to 500° C. for about 1 to 3 hours. When the heat treatment temperature is lower than about 300° C., the binder included in the cathode scarp may not be carbonized, and thus the current collector may not be separated from the cathode electroactive material layer. When the heat treatment temperature is higher than about 500° C., a phase change of the cathode electroactive material may occur, and the crystallinity and particle diameter of the cathode electroactive material may increase. Thus, performance of a battery may be degraded, and a great amount of energy may be consumed, which is uneconomical.

The heat treatment time may be about 1 to 3 hours. When the heat treatment time is less than about 1 hour, the binder may not be carbonized. When the heat treatment time is longer than about 3 hours, a phase change of the cathode electroactive material may occur, and the crystallinity and particle diameter of the cathode electroactive material may increase. Thus, performance of a battery may be degraded, and a great amount of energy may be consumed, which is uneconomical.

2) Next, in operation S2, the $LiFePO_4$ cathode electroactive material may be collected by separating the current collector from the $LiFePO_4$ cathode scrap heat treated in operation S1. After the heat treatment of operation S1, due to thermal expansion difference between the cathode electroactive material layer and the conductive metal thin plate used as the current collector, the conductive metal thin plate used as the current collector may be easily separated from the cathode electroactive material layer. By grinding the separated cathode electroactive material layer and sieving the ground cathode electroactive material layer, cathode electroactive material powder may be collected. For the sieving, a 200-mesh sieve may be used.

3) Next, in operation S3, the $LiFePO_4$ cathode electroactive material collected in operation S2 may be heat treated in an atmosphere of air. This heat treatment is performed to oxidize Fe existing in the cathode electroactive material so that the electroactive material is easily dissolved in an acidic solution.

Heat treatment temperature for operation S3 may be about 700 to 900° C. When the heat treatment temperature is lower than about 700° C., Fe may not be oxidized. When the heat treatment temperature is higher than about 900° C., the structure of the LiFePO4 cathode electroactive material may be changed.

4) Next, in operation S4, $LiFePO_4$ may be precipitated by dissolving the $LiFePO_4$ cathode electroactive material heat treated in operation S1 in an acidic solution, and then injecting ammonia water thereto.

The acidic solution of operation S4 may include at least one selected from the group consisting of hydrochloric acid, phosphoric acid, nitric acid, and sulfuric acid. When $LiFePO_4$ is dissolved in the acidic solution, it may exist as $Li^+$, $Fe^{3+}$, $PO_4^{3-}$ ions. When the ammonia water is added to this solution, $Fe^{3+}$ and $Li^+$ may be separated. According to the type of acidic solution to which the ammonia water is added, the pH level may be adjusted to between 5 and 8, and by maintaining the solution at a temperature of about 20 to 70° C. for about 1 to 12 hours, $FePO_4$ may be precipitated.

5) Next, in operation S5, the $FePO_4$ solid may be obtained by filtering the solution obtained in operation S4. By cleaning and drying the solid, refined $FePO_4$ powder may be obtained.

The filtrate is a solution in which $NH_4Cl$ and $LiCl$ are mixed. After evaporation and concentration processes, a solid in which $NH_4Cl$ and $LiCl$ are mixed may be obtained. A crystal of $NH_4Cl$ is not melted but is sublimated into gas when heated at a temperature of about 337.8° C. or higher. Therefore, when the mixed solid is heat treated for about 1 to 12 hours at a temperature of about 350 to 700° C. in an inert atmosphere, the crystal of $NH_4Cl$ may be removed and ash-colored pure LiCl salt may be collected.

6) Next, in operation S6, crystalline $FePO_4$ may be obtained by heat treating the $FePO_4$ obtained in operation S5 in an atmosphere of air, or crystalline $Fe_2P_2O_7$ may be obtained by heat treating the obtained $FePO_4$ in an atmosphere of hydrogen. The $FePO_4$ obtained in operation S5 is amorphous, but may be changed into a crystalline material. That is, if the heat treatment is performed in an atmosphere of air where oxygen exists, $FePO_4$ may be formed, and if the heat treatment is performed in an atmosphere of hydrogen, $Fe_2P_2O_7$ may be formed.

The heat treatment of operation S6 may be performed at a temperature of about 400 to 800° C. for about 1 to 12 hours. When the heat treatment temperature is lower than about 400° C., a crystal phase of $FePO_4$ or $Fe_2P_2O_7$ may not be easily formed. When the heat treatment temperature is higher than about 800° C., the structure of $FePO_4$ or $Fe_2P_2O_7$ may be changed. When the heat treatment time is less than about one hour, a crystal phase of $FePO_4$ or $Fe_2P_2O_7$ may not be easily formed. When the heat treatment time is longer than about 12 hours, the structure of $FePO_4$ or $Fe_2P_2O_7$ may be changed.

7) Next, in operation S7, the lithium compound is mixed with the $FePO_4$ or $Fe_2P_2O_7$ obtained in operation S6 so that the mole ratio of Fe to Li is 1:1, and the carbon source is further mixed. Then, by performing heat treatment in a reducing atmosphere or inert atmosphere, the LiFePO4 cathode electroactive material may be obtained.

Any lithium compound capable of providing lithium during the heat treatment may be used. More specifically, the lithium compound may include at least one selected from the group consisting of $Li_2CO_3$, $Li(OH)$, and $Li_3PO_4$.

The carbon source may be mixed such that the ratio of the carbon source is about 1 to 10 wt % in comparison with finally generated $LiFePO_4$. The carbon source is a remaining carbon material after pyrolysis. Any carbon source capable of imparting conductivity to a cathode may be used. However, the carbon source is not limited thereto. More specifically, the carbon source may include at least one selected from the group consisting of carbon black, acetylene black, and sucrose.

The heat treatment of operation S7 may be performed at a temperature of about 400 to 800° C. for about 6 to 24 hours. When the heat treatment temperature is lower than about 400° C., crystalloid $LiFePO_4$ may not be easily formed. When the heat treatment temperature is higher than about 800° C., the structure of $LiFePO_4$ may be changed. When the heat treatment time is less than about 6 hours, crystalloid $LiFePO_4$ may not be easily formed. When the heat treatment time is longer than about 12 hours, the structure of $LiFePO_4$ may be changed or impurities may be generated.

To form the inert atmosphere, argon gas and nitrogen gas may be used. To form the reducing atmosphere, hydrogen gas may be used.

A second embodiment of the present invention may be a $LiFePO_4$ cathode electroactive material for a lithium secondary battery fabricated according to the first embodiment.

A third embodiment of the present invention may be a cathode for a lithium secondary battery fabricated by using the $LiFePO_4$ cathode electroactive material of the second embodiment.

By mixing and stirring a cathode electroactive material, a conductive material, and a binder, slurry may be formed. By applying the slurry on a conductive thin film by using a doctor blade technique, a cathode may be fabricated.

The $LiFePO_4$ cathode electroactive material of the second embodiment may be used as the cathode electroactive material.

The binder may be a water-based binder or organic binder. More specifically, a polymer solution in which sodium carboxymethyl cellulose (1 wt % in water) and styrene butadiene rubber (40 wt % in water) are mixed may be used as the binder, and polyvynilidene fluoride (PVDF) may be used as the organic binder. However, the binder is not limited thereto.

Any material capable of imparting conductivity to the cathode may be used as the conductive material. More specifically, carbon black (trade name: Denka Black) or graphite (trade name: KS6) may be used.

Any material having excellent electron conductivity may be used as the conductive metal thin plate. More specifically, the conductive metal thin plate may include at least one selected from the group consisting of an aluminum thin plate, a copper thin plate, a gold thin plate, a silver thin plate, and a platinum thin plate.

The amount of cathode electroactive material may be about 80 to 90 wt %, the amount of binder may be about 5 to 10 wt %, and the amount of conductive material may be about 5 to 10 wt %. For the conductive material, the weight ratio of carbon black to graphite may be 1:1.

Here, for appropriate viscosity, i.e. about 10,000 to 30,000 cp, of the slurry, a sodium carboxymethyl cellulose (1 wt % in water) polymer solution may be added by as much as one to two times more than the weight of the mixture.

Further, to homogenize the slurry, the slurry may be stirred at a speed of about 5,000 rpm for about 40 minutes by using a homogenizer.

The thickness of the conductive thin film may be about 20 μm, and the thickness of the slurry applied onto the conductive thin film may be about 80 to 250 μm.

A fourth embodiment of the present invention may be a lithium secondary battery including the cathode of the third embodiment.

Hereinafter, the present invention will be described in detail with reference to examples and a comparative example.

Example 1

A $LiFePO_4$ cathode scrap collected during a process of fabricating a cathode for a lithium secondary battery is put into a tube furnace and heat treated at a temperature of about 300° C. in an atmosphere of nitrogen for about 3 hours so as to carbonize a binder and separate an aluminum current collector and a cathode material. Then, the separated cathode material is heat treated at a temperature of about 700° C. in an atmosphere of air for about 6 hours, and is dissolved in a hydrochloric acid solution.

In order to separate $Fe^{3+}$ and $Li^+$ existing in the hydrochloric acid solution, ammonia water is added so as to adjust the pH level to 5.5. The solution is maintained at a temperature of about 60° C. for about 3 hours to obtain amorphous $FePO_4$ precipitate.

The collected amorphous $FePO_4$ precipitate is heat treated at a temperature of about 600° C. in an atmosphere of air for about 6 hours so as to obtain crystalloid $FePO_4$.

The crystalloid $FePO_4$ and a $Li_2CO_3$ precursor are mixed at a mole ratio of about 1:0.5 which is a stoichiometric ratio, and 3 wt % of carbon black (trade name: Denka Black) is added. Then, ball-milling is performed at a speed of about 250 rpm for about 2 hours.

Thereafter, heat treatment is performed at a temperature of about 750° C. in an atmosphere of mixed gas of argon and hydrogen for about 10 hours so as to obtain a $LiFePO_4$ cathode electroactive material.

About 8.5 g of the fabricated $LiFePO_4$ cathode electroactive material; about 0.5 g of carbon black (trade name: Denka Black) and about 0.5 g of graphite (trade name: KS6) as conductive materials; and about 0.5 g of a polymer solution in which sodium carboxymethyl cellulose (1 wt % in water) and styrene butadiene rubber (40 wt % in water) are mixed, and viscosity is adjusted to about 20,000 cp. Then, this mixture is stirred at a speed of about 5,000 for about 40 minutes by using a homogenizer in order to obtain slurry. The slurry is applied onto an aluminum thin film having a thickness of about 20 μm to a thickness of about 150 μm by using a doctor blade technique so as to fabricate a $LiFePO_4$ cathode.

The fabricated $LiFePO_4$ cathode and a lithium metal anode having a thickness of about 150 μm are stacked, a polypropylene separator is arranged between the two electrodes, and electrolyte in which 1M $LiPF_6$ lithium salt is dissolved is injected into an organic solvent in which ethylene carbonate, ethyl methyl carbonate, and dimethyl carbonate are mixed so as to fabricate a coin-type lithium secondary battery.

Example 2

In the same manner as described above with respect to example 1, amorphous $FePO_4$ is collected from a $LiFePO_4$ cathode material dissolved in hydrochloric acid, and is heat treated at a temperature of about 700° C. in an atmosphere of hydrogen for about 6 hours to thereby obtain crystalloid $Fe_2P_2O_7$.

The crystalloid $Fe_2P_2O_7$ and a $Li_2CO_3$ precursor are mixed at a mole ratio of about 1:1 which is a stoichiometric ratio, and about 3 wt % of carbon black (trade name: Denka Black) is added. Then, ball-milling is performed at a speed of about 250 rpm for about 2 hours. Then, the ball-milled mixture is heat treated at a temperature of about 750° C. in an atmosphere of mixed argon and hydrogen (hydrogen content is about 5 mol %) for about 10 hours in order to fabricate a $LiFePO_4$ cathode electroactive material.

Thereafter, in the same manner as described above with respect to example 1, a $LiFePO_4$ cathode is fabricated, and a lithium secondary battery is fabricated by using the $LiFePO_4$ cathode.

Comparative Example

A cathode and a lithium secondary battery are fabricated in the same manner as described above with respect to example 1 except that a $LiFePO_4$ cathode electroactive material which has not been reprocessed, is used instead of a $LiFePO_4$ cathode electroactive material fabricated by reprocessing a cathode scrap.

In order to confirm that the cathode electroactive material of each of examples 1 and 2 and the comparative example is $LiFePO_4$, X-ray diffraction analysis is conducted, and the cathode electroactive material of each of examples 1 and 2 and the comparative example is observed by using a scanning electron microscope (SEM). Further, tests on capacity and cycle are conducted by using a constant-current method in order to check performance of the cathodes of examples 1 and 2 and the comparative example.

Figure 2:
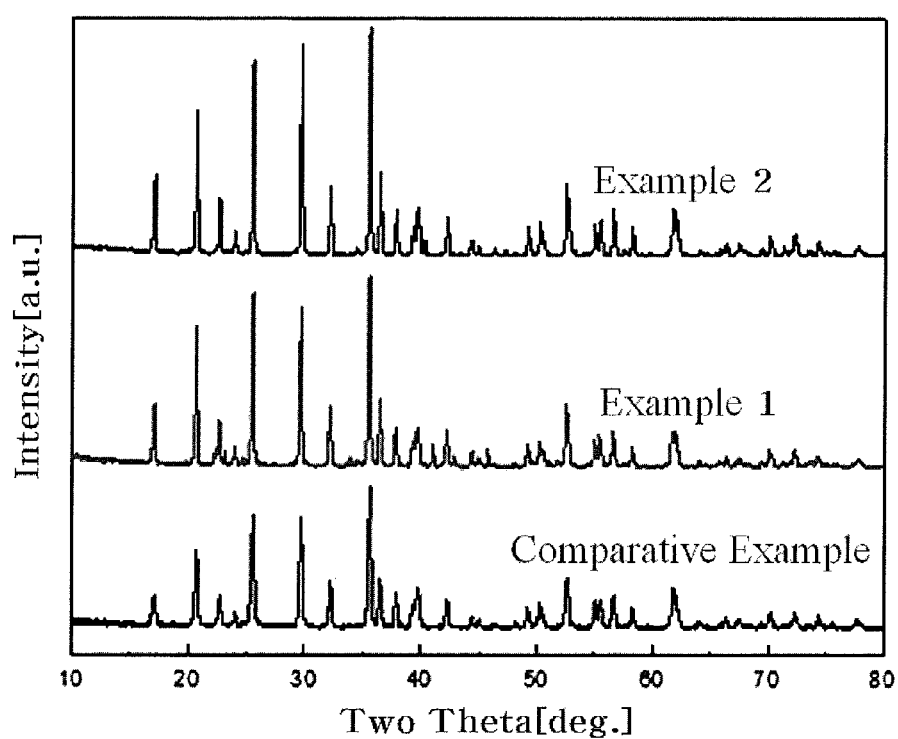
FIG. 2 is a graph illustrating the results of X-ray diffraction analysis on cathode electroactive materials of examples 1 and 2 and a comparative example.

FIG. 2 is a graph illustrating the results of the X-ray diffraction analysis on the cathode electroactive materials of examples 1 and 2 and the comparative example.

Referring to FIG. 2, it may be understood that all the cathode electroactive materials of examples 1 and 2 and the comparative example are $LiFePO_4$. Thus, it may be confirmed that a $LiFePO_4$ cathode electroactive material may be fabricated by reprocessing a cathode scrap according to the present invention.

Figure 3:
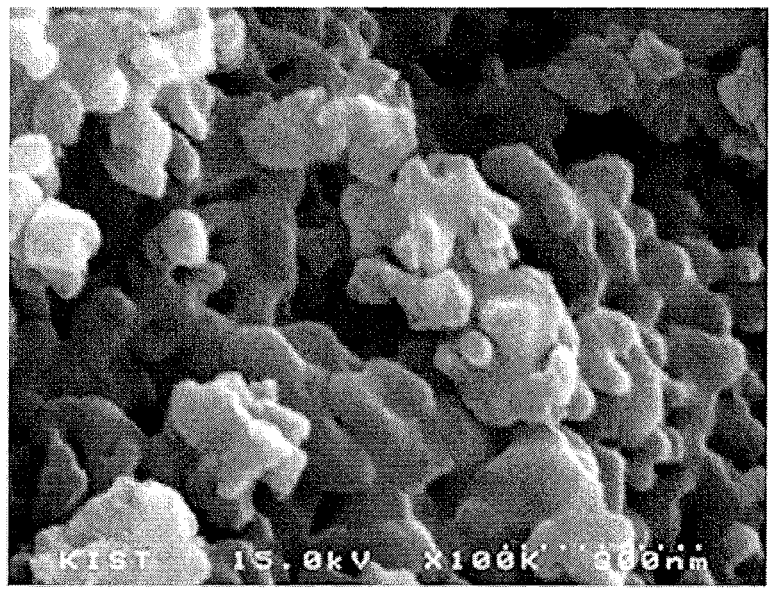
FIGS. 3(A) and 3(B) are scanning electron microscope (SEM) pictures of $LiFePO_4$ cathode electroactive materials fabricated according to examples 1 and 2.
Figure 3:
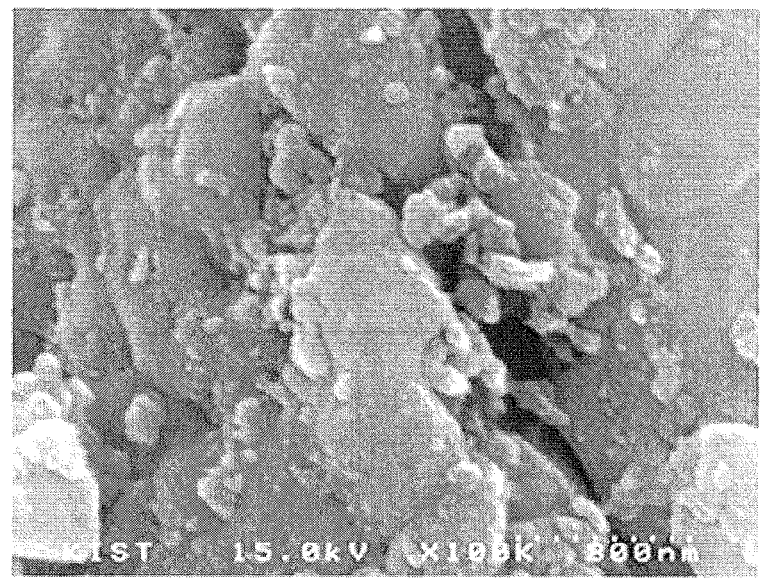

FIGS. 3(A) and 3(B) are SEM pictures of the $LiFePO_4$ cathode electroactive materials fabricated according to examples 1 and 2.

Referring to FIG. 3(A), the $LiFePO_4$ cathode electroactive material of example 1 has a globular shape and a size of several hundred nanometers. Referring to FIG. 3(B), the $LiFePO_4$ cathode electroactive material of example 2 has a plate shape and is larger than that of example 1.

Figure 4:
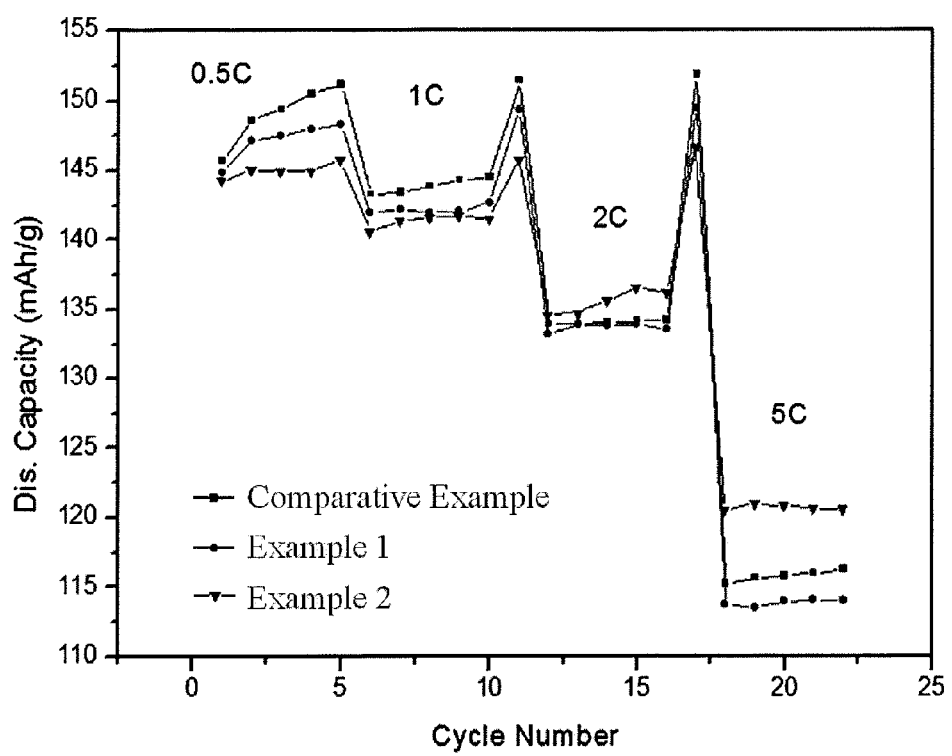
FIG. 4 is a graph illustrating capacity and cycle characteristics according to discharge rates of the $LiFePO_4$ cathode electroactive materials of examples 1 and 2.

FIG. 4 is a graph illustrating capacity and cycle characteristics according to discharge rates of the $LiFePO_4$ cathode electroactive materials of examples 1 and 2.

Referring to FIG. 4, it may be confirmed that the capacity and cycle characteristics of examples 1 and 2 are similar to those of the comparative example. In particular, it may be confirmed that example 2 has more improved characteristics in comparison with the comparative example when the discharge rate is 2C or 5C.

As a result, even though a $LiFePO_4$ cathode electroactive material is fabricated by reprocessing or recycling a cathode scrap according to the present invention, and a lithium secondary battery is fabricated by using the fabricated cathode electroactive material, performance of the cathode electroactive material or lithium secondary battery is not limited. Therefore, due to the recycling or reprocessing of the cathode scrap, cost may be reduced and pollution may be prevented.

According to the present invention, a simple, environmentally friendly, and economical method for fabricating a LiFePO4 cathode electroactive material for a lithium secondary battery by recycling, and a LiFePO4 cathode electroactive material for a lithium secondary battery, a LiFePO4 cathode, and a lithium secondary battery fabricated thereby can be implemented.

The terminology used herein is not for delimiting the present invention but for describing the specific embodiments. The terms of a singular form may include plural forms unless otherwise specified.

The term "include" or "have" indicates existence of a feature, a number, a process, an operation, a component, or a combination thereof but does not exclude them.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method for fabricating a $LiFePO_4$ cathode electroactive material for a lithium secondary battery, the method comprising:

heat treating a cathode scrap comprising a $LiFePO_4$ cathode electroactive material in an atmosphere of nitrogen;

collecting the $LiFePO_4$ cathode electroactive material by separating a current collector from the heat treated $LiFePO_4$ cathode scrap;

heat treating the collected $LiFePO_4$ cathode electroactive material in an atmosphere of air;

precipitating $FePO_4$ by dissolving the heat treated $LiFePO_4$ cathode electroactive material in an acidic solution, and injecting ammonia water thereto;

obtaining a $FePO_4$ solid by filtering the obtained solution;

obtaining crystalline $FePO_4$ by heat treating the obtained $FePO_4$ in an atmosphere of air, or obtaining crystalline $Fe_2P_2O_7$ by heat treating the obtained $FePO_4$ in an atmosphere of hydrogen;

obtaining a $LiFePO_4$ cathode electroactive material by mixing a lithium compound with the obtained $FePO_4$ or $Fe_2P_2O_7$ such that the mole ratio of Fe to Li is 1:1, mixing a carbon source, and then performing heat treatment in a reducing atmosphere or inert atmosphere; and mixing a binder comprising sodium carboxymethyl cellulose and styrene butadiene rubber with the $LiFePO_4$ cathode electroactive material to form a slurry.

2. The method of claim 1, wherein the carbon source comprises at least one selected from the group consisting of carbon black, acetylene black, and sucrose.

3. The method of claim 1, wherein the lithium compound comprises at least one selected from the group consisting of $Li_2CO_3$, $Li(OH)$, and $Li_3PO_4$.

4. The method of claim 1, wherein the heat treating of the cathode scrap is performed at a temperature of about 300° C. to about 500° C. for about 1 to 3 hours.

5. The method of claim 1, wherein the acidic solution comprises at least one selected from the group consisting of hydrochloric acid, phosphoric acid, nitric acid, and sulfuric acid, ammonia water is added to the acidic solution to adjust the pH level to between 5 and 8, and the ammonia-water-added solution is maintained at a temperature of about 20 to 70° C. for about 1 to 12 hours.

6. The method of claim 1, wherein the heat treating of the obtained $FePO_4$ is performed at a temperature of about 400° C. to about 800° C. in an atmosphere of hydrogen for about 1 to 12 hours.

7. The method of claim 1, wherein the heat treatment in the reducing atmosphere of inert atmosphere is performed at a temperature of about 400° C. to about 800° C. for about 6 to 24 hours.

8. A $LiFePO_4$ cathode electroactive material for a lithium secondary battery, fabricated according to the method of claim 1.

9. A cathode for a lithium secondary battery, abricated by using the $LiFePO_4$ cathode electroactive material of claim 8.

10. A lithium secondary battery comprising the cathode for a lithium secondary battery of claim 9.

* * * * *